United States Patent Office 3,496,150
Patented Feb. 17, 1970

3,496,150
PHOTOCHEMICAL BLEACHING OF POLYMALE-ATE HOMOPOLYMERS AND COPOLYMERS
Paul J. Kropp, Springfield Township, Hamilton County, Ohio, assignor to The Procter & Gamble Company, Cincinnati, Ohio, a corporation of Ohio
No Drawing. Filed Mar. 22, 1968, Ser. No. 715,198
Int. Cl. C08f 1/88, 27/22
U.S. Cl. 260—78.4   15 Claims

ABSTRACT OF THE DISCLOSURE

The photochemical bleaching of polymaleate homopolymers and copolymers by the process of bleaching with ultraviolet light in the presence of hydrogen peroxide.

Field of the invention

This invention relates to a process for bleaching polymaleate materials including homopolymers and copolymers thereof. More specifically, it relates to a process of bleaching polymaleate materials by a photochemical technique embodying the use of ultraviolet irradiation and hydrogen peroxide. As employed hereinafter in the specification and claims, the term polymaleate is intended to include the various polymeric forms of maleic acid, maleic anhydride and water-soluble salts of maleic acid.

Polymaleate materials have become important for a number of purposes. For example, poly(maleic acid) and especially the water-soluble salts thereof, are excellent sequestering materials and are particularly adapted for use in built detergent formulations containing a detergent surfactant. In addition they are useful as textile chemicals and in the surface treatment of metals.

Satisfactory methods of preparing homopolymers of maleic anhydride have only recently been known. For example, U.S. Patent 3,359,246 to Berry, describes the polymerization of maleic anhydride to form a high molecular weight homopolymer by reacting a melt of maleic anhydride and employing an acetyl peroxide catalyst. Similarly, U.S. Patent 3,186,972 to Lang et al. describes the preparation of homopolymers of maleic anhydride by a process which employs the irradiation with gamma rays from a cobalt 60 source of a maleic anhydride solution in acetic anhydride. The anhydride homopolymers prepared in accordance with the above methods, for example, can conventionally be converted to their acidic form by hydrolysis employing methods known to those skilled in the art. Similarly, the alkali metal salts thereof can be conventionally prepared by merely neutralizing with a soluble alkali metal salt. Irrespective of the precise methods employed in the formation of homopolymers of maleic anhydride, such polymers have been characterized by an undesirable reddish-brown to yellow color. This problem is particularly troublesome in the detergency formulation arts wherein a substantially colorless product is desired for use in detergent formulations which are substantially white in appearance. In addition, this yellow color detracts from the performance of detergent formulations containing polymaleate salt builders derived from these poly(maleic anhydride) materials in that they tend to precipitate as calcium salts or complexes onto the fabrics which are laundered, thereby creating an unattractive appearance.

Various attempts have been made in the art to produce polymaleates of the hereinbefore described type which are substantially free from objectionable color by carefully controlling the process conditions. In addition, known decolorization and bleaching techniques have been employed to minimize the color which is generally found in the preparation of such materials. For example, decolorization treatments have included absorption of color by activated charcoal, Carlton's earth, Fuller's earth, oxidative bleaching with hypochlorite, ozone, hydrogen peroxide, reductive treatment with sodium borohydride, sodium bisulfite, sulfur dioxide, and hydrogenation under a wide variety of conditions. Despite the employment of these techniques, none have been entirely satisfactory in the production of polymaleate materials characterized by a substantially white color and adaptable for use in detergent formulations. While limited success has been obtained from the employment of hydrogen peroxide alone, in that satisfactory degrees of bleaching can be attained, such a method has the disadvantages of requiring a considerable amount of time and elevated temperatures. Since the elevated temperatures required to attain high levels of bleaching are generally harmful to polymaleate materials and the method is time consuming, this approach is not satisfactory in terms of processing efficiency and economy. Of the various and numerous bleaching methods known in the bleaching art, only the photochemical bleaching process as described hereinafter has been found to be satisfactory in terms of processing efficiency to produce substantially white products adaptable to use especially in white detergent formulations.

It is an object of the present invention to provide a process for improving the color of polymaleate materials including homopolymers and copolymers thereof.

It is a further object to provide a novel process for bleaching polymaleate materials by a photochemical technique. It is another object to provide a novel photochemical bleaching process to produce poly(maleic anhydride) and the acid and water-soluble salts thereof especially adapted to use in substantially-white detergent formulations. Other objects will become obvious from the description of the invention which hereinafter follows.

Summary of the invention

These and other objects are achieved in accordance with the present invention which comprises a process of bleaching a polymaleate homopolymer or random copolymer containing at least 45 mole percent of a maleate component selected from the group consisting of maleic anhydride, maleic acid and water-soluble salts of maleic acid which comprises irradiating the polymaleate homopolymer or random copolymer with ultraviolet light in the presence of hydrogen peroxide to provide a polymaleate of improved color. In accordance with the present invention a polymaleate material is photobleached by a process which comprises dissolving the polymaleate in an appropriate solvent and irradiating with a source of ultraviolet radiation for a time sufficient to effect an improvement in the color of such polymaleate material.

Detailed description of the invention

The novel photochemical bleaching process of the present invention is conveniently practiced by irradiating with an ultraviolet source a solution of the polymaleate material in a substantially non-interfering solvent. Non-interfering solvents as employed herein are those solvents which are capable of dissolving the polymeric starting material and hydrogen peroxide and which do not substantially interfere with the transmission of the ultraviolet radiation. Organic solvents which interfere with the bleaching process, as for example by conversion upon irradiation with ultraviolet light to side products, are to be avoided.

Suitable solvents are to be found in such materials as water, alkanols, alkyl ethers, aromatic ethers, mixed alkyl aromatic ethers, cyclic ethers and glycol ethers. Examples of suitable alcohol solvents include alkyl monohydric alcohols of from 1 to about 10 carbon atoms, as for example, methanol, ethanol n-propyl alcohol, isopropyl alcohol, t-butyl alcohol, 2-ethyl hexyl alcohol and n-decyl alcohol. Aliphatic dihydric alcohols include those having from 2 to about 10 carbon atoms, as for example alkylene glycols such as ethylene glycol, propylene glycol, 1,6-dihydroxyhexane and 1,10-dihydroxydecane.

Examples of suitable ether solvents are those having from 2 to about 10 carbon atoms including dialkyl ethers such as dimethyl ether, diethyl ether, dioctyl ether, diaryl ethers such as diphenyl ether, mixed alkyl aryl ethers such as methyl phenyl ether, cyclic monooxy ethers such as tetrahydrofuran, cyclic dioxy ethers such as dioxane and glycol ethers such as 1,2-dimethoxyethane and diethylene glycol dimethyl ether.

Preferred solvents are water and the alkanols for the reasons that they are readily available and do not interfere with the irradiation treatment. Since water readily converts maleic anhydride polymers to their acidic forms, water is not preferred where the anhydride structure is desirably left intact. It will be appreciated of course that the foregoing exemplary solvents can be used in combination and that they are listed by way of example only. Other solvents similarly non-interfering in nature may likewise be employed to advantage.

In preparing solutions for irradiation in accordance with the photobleaching method of the present invention, the polymeric compound is dissolved in a solvent such that it is present in an amount by weight of from about 0.01% to about 50%. While solutions wherein the polymer is present in amounts in excess of the limit of solubility can be employed, it is preferable from the standpoint of efficiency of operation and uniformity in decolorization to employ solutions having the dissolved polymer present in an amount approximating the limit of solubility. The limit of solubility of such materials depends normally upon the particular solvent employed and the molecular weight of the polymer employed. Poly-(maleic anhydrides) and poly(maleic acid) homopolymers prepared in accordance with conventional techniques known to those skilled in the art range in molecular weight from about 300 to possibly about 50,000. These materials when photobleached in water are generally employed in solutions at about the 0.01% to about 50% level, preferably at about 10% to about 20%.

In preparing solutions for irradiation according to the present invention, a solution of the poly(maleic anhydride), poly(maleic acid), water-soluble salt thereof or polymaleate copolymer in an appropriate non-interfering solvent of the hereinbefore described type is admixed with the hydrogen peroxide component. As the precise sequence of combining the polymeric solution and the hydrogen peroxide is not a critical aspect of the present invention, the hydrogen peroxide can be added directly to a solution of the polymer prepared as hereinbefore described. Alternatively, a solution of the polymer can be added to the hydrogen peroxide. While the hydrogen peroxide can be added in a 100% hydrogen peroxide form, normally a commercially available 30% aqueous solution is employed and is added to a solution of the polymaleate material in an amount to provide the desired hydrogen peroxide concentration. The hydrogen peroxide level which is employed in the present invention ranges from about 0.4% to the limit of solubility in the system to be irradiated. Normally, the amount of hydrogen peroxide employed ranges from about 0.4% to about 10%. A preferred range is from about 1% to about 4% by weight hydrogen peroxide based upon the total weight of the solution to be irradiated according to the photochemical process of the present invention.

The source of hydrogen peroxide employed herein constitutes a critical aspect of the present invention. Those materials commonly employed in the bleaching arts which in aqueous solutions split out hydrogen peroxides, e.g., perborates, persulfates and the like, do not find applicability herein inasmuch as the hastening effect of ultraviolet light on the hydrogen peroxide bleaching of poly- maleates is not found in the case of the employment of such materials.

The reaction vessels used in the irradiation of polymaleate materials are not particularly critical. Quartz, Vycor, Corex, Pyrex, or common soft glass reaction vessels can be used herein. Pyrex reaction vessels, however, should not be used when low-pressure mercury lamps emitting wave lengths less than 280 m$\mu$ are utilized as Pyrex tends to filter out wave lengths below 280 m$\mu$. Pyrex reaction vessels are preferred for use in this photochemical reaction. The photochemical bleaching process of the present invention can be carried out in conventional photochemical reaction vessels. A convenient method of practicing the present invention comprises irradiating a solution hereinbefore described in a standard Pyrex reaction vessel equipped with means for a nitrogen purge to provide agitation of the solution during irradiation and having a jacketed, water-cooled Quartz, Vycor, or Pyrex immersion well into which is placed the ultraviolet light lamp source. When direct sunlight is employed as the ultraviolet light source, a convenient method of effecting the photochemical reaction of the present invention is to place a solution of the polymaleate in a conventional reaction vessel at ambient temperatures into the path of directly incident sunlight.

When carrying out the novel bleaching process of the present invention any convenient source of ultraviolet radiation can be used, i.e., a light source that emits photo energy at wave lengths distributed throughout the range of from about 200 m$\mu$ to about 400 m$\mu$. For optimum photobleaching effect, it is preferred to employ a source which has its greatest energy distribution concentrated within the range of about 280 m$\mu$ to about 400 m$\mu$.

A commonly available radiant energy source which can be employed herein is direct sunlight inasmuch as the radiation of the sun contains ultraviolet light. Similarly, lamps which operate on the principle of a zinc, cadmium, thallium, gallium, indium, carbon, mercury, zirconium, hydrogen, deuterium xenon or helium arc can likewise be employed in the exercise of the present invention. Preferred lamps for employment in the present invention include those commercially available high- pressure mercury arc lamps having a total power capacity ranging from about 50 watts to about 10,000 watts, preferably from about 100 watts to about 600 watts. These lamps emit a broad spectrum of light including ultraviolet radiation. Likewise preferred are the low-pressure mercury lamps having a total power capacity ranging from about 0.5 watt to about 50 watts, preferably from about 0.5 watt to about 2 watts. These lamps emit monochromatic light generally in wave lengths of about 253.7 m$\mu$ or with the addition of suitable phosphors in the regions of 300 m$\mu$ and 355 m$\mu$, for example. Other utilizable light sources are ordinary fluorescent lamps which emit in the 350 m$\mu$ region of the light spectrum. The lamps hereinbefore described are well known to those skilled in the art and are commercially available. These lamps are described in greater detail in "Ultraviolet Radiation" by L. R. Coller, 2nd edition, John Wiley & Sons, Inc. (1952), which disclosure is incorporated herein by reference.

The novel photochemical reaction of the present invention can be carried out over a wide range of temperatures. For example, the reaction can be conducted at a temperature from about −40° to about 150° C. Inasmuch as the hydrogen peroxide tends to decompose rapidly at temperatures in excess of about 100° C., it is preferred aspect of the present invention to effect the reaction at a temperature below this decomposition temperature. A preferred tempertture range is from 20 to about 80° C. When the reaction is conducted at room temperature, i.e. at about 25° C. the reaction is primarily photochemical rather than thermal in nature. Since elevation of temperature above ambient temperatures hastens non-photochemical hydrogen peroxide bleaching of organic materials, temperatures above ambient temperatures can likewise be employed in the photochemical bleaching of polymaleate materials. Because many of the lamps employed in the present invention, e.g., high pressure mercury lamps evolve heat, some sort of cooling device is preferably employed to maintain the temperature of the photobleaching process within the prescribed temperature limits.

Normally, it is preferable in conducting the novel photochemical reaction of the present invention to employ agitation of the reactants. This can easily be accomplished by bubbling an inert gas such as nitrogen through the reaction medium during the irradiation. In addition, this inert atmosphere prevents quenching and contamination and possible competing side reactions. Other suitable means of agitating the material to be photobleached include the use of a falling film technique or conventional stirring.

The time required for the irradiation for polymaleate compounds to effect bleaching is generally a period of time from about 1 minute to about 100 hours, preferably from about 10 minutes to 3 hours. The reaction time varies with the concentration of the starting material in the solvent, the nature of the solvent, the intensity of the irradiation source, the physical reaction conditions, the temperature of reaction and the adbsorption of the irradiation by the reaction vessel. However, the course of the reaction can readily be followed by conventional techniques, e.g., by observing the extent of decolorization as the reaction proceeds. It is highly preferable to stop the reaction when the maximum decolorization has been obtained as determined visually. Further irradiation subsequent to this time may result in the formation of undesirable secondary products and is generally uneconomical from a time and efficiency standpoint.

The decolorized or photobleached polymer irradiated as described hereinbefore is removed from solution by conventional separation techniques known to those skilled in the art, as for example, by evaporation, freeze drying, filtration, coacervation or precipitation. A preferred technique is that of neutralization followed by heat or freeze-drying.

The polymaleate materials which can be photobleached in accordance with the present invention include any of the poly(maleic anhydride) and poly(maleic acid) materials prepared by those methods known to those skilled in art. Likewise the colored water-soluble salts of poly-(maleic acid) can be photobleached to advantage employing the photochemical method of the present invention. These materials have molecular weights ranging from about 300 to about 50,000. Examples of homopolymeric polymaleates which can be bleached by the process of the present invention are described in U.S. Patent 3,359,246 to Berry and in U.S. Patent 3,186,972 to Lang et al. which references are incorporated herein by reference.

Homopolymeric maleic anhydride materials of U.S. Patent 3,359,246 which can be photobleached in accordance with the present invention include those prepared by polymerizing maleic anhydride to form poymers having a molecular weight greater than about 300 by a process which comprises the steps of adding to a melt of said maleic anhydride from about 0.5% to about 8% by weight of the maleic anhydride of acetyl peroxide, maintaining the temperature from about 55° C. to about 150° C. and preferably recovering the polymer from the reaction mixture.

Especially desirable results are obtained in the above process when either or both of the following conditions are met: the acetyl peroxide is present in an amount of from about 2% to about 6% by weight of the maleic anhydride; the temperature is maintained from about 70° C. to about 130° C. Outstanding results are obtained when about 5% of the acetyl peroxide is used. The polymer obtained from the process of U.S. Patent 3,359,246 is substantially free from non-removable impurities, both colorimetric and odoriferous. Nevertheless, when dissolved in water at a 10% by weight concentration, the polymer obtained by this process is characterized by a fairly light straw color.

It is difficult to measure precisely the molecular weight of polymaleates of the type herein described and different values can be obtained depending on the method of analysis used. Cryoscopic measurements indicate the molecular weight of poly(maleic anhydride), for example, to be in the range of about 300 to 1000. Light scattering results indicate a molecular weight ranging possibly up to 50,000. However, the most accurate method for determining the molecular weight of maleic anhydride homopolymers consist of ultracentrifugal measurements. Ultracentrifugal results indicate a poly(maleic anhydride) molecular weight of from about 3,500 to about 7,000, the most probable molecular weight being 5,200±1,000. Gel filtration studies on Sephadex columns generally confirm the above-mentioned 5,200±1,000 molecular weight result.

The maleic acid anhydride homopolymers prepared according to U.S. Patent 3,186,972 are characterized by relatively high molecular weight and are prepared by irradiating maleic anhydride in a non-solid, non-gaseous form, i.e., in liquid form or in solution, such as dissolved in a non-polymerizable liquid, with high energy ionizing radiation such as gamma rays or X-rays of an intensity of at least 10,000 rads per hour and for a total dose of from about 2 to about 60 megarads. Polymers prepared in accordance with this method are characterized by relatively high molecular weights as determined by intrinsic viscosity measurements. The materials are characterized by an intrinsic viscosity of at least 0.05 deciliter per gram of greater as determined in 2-butanone.

The hereinbefore described homopolymers of maleic anhydride are readily converted to poly(maleic acid) polymers by hydrolysis. This can be effectuated by dissolving the poly(maleic anhydride) polymer in water at room temperatures. Generally it is preferable to employ heating so as to assure complete cleavage of the anhydride bonds and formation of acidic moieties.

Metallic salts of the above described poly(maleic acids) can be prepared by neutralization with a soluble salt of the desired metal. For example, alkali metal salts such as the sodium, potassium and lithium salts can be prepared by numerous acid-salt conversion reactions which are well known in the art. A particularly desirable method is as follows: Dissolving poly(maleic anhydride) in water and heating at from 90° C. to about 100° C. for a period of time of approximately 0.5 hour; neutralizing the aqueous poly(maleic acid) thus obtained with an alkali solution, for example, NaOH, up to a pH of 10.0; heating on a steam bath for a period of time ranging from about 3 to about 4 hours; and readjusting the pH to about 10.0. The solid alkali metal (e.g. sodium) polymaleate may be recovered from the above solution by any of several methods such as evaporation, freeze-drying, filtration, coacervation, or precipitation. This latter method can be effectuated, for example, by pouring a concentrated aqueous solution of the polymer into rapidly sheared ethanol; the partially dried polymaleate salt thus obtained can be further dried in a vacuum oven.

Other polymaleate materials which can be photobleached by the process of the present invention to provide polyelectrolyte builders especially adapted for use in detergent compositions are certain random copolymers of maleic acid, maleic anhydride or water-soluble salts thereof and comonomers wherein the polymaleate component constitutes a substantial portion of the polymeric structure. These copolymers are characterized by the presence therein of the polymaleate species in a proportion of at least 45 mole percent and are formed by randomly polymerizing the maleate monomer with a comonomer having the general formula

wherein each R is selected from the group consisting of hydrogen, methyl, carboxyl, carboxymethyl and carboxyethyl wherein only one R can be methyl. Preferred polyelectrolyte copolymers having about 50 to about 80 mole percent maleate species can likewise be readily bleached by the photochemical method of the present invention.

As employed herein the term random copolymer is intended to embrace those copolymers wherein each comonomer is present in the polymer in both single and multiple units. Thus, copolymers of a maleate component and a comonomer wherein the maleate and comonomeric species are present in a 1:1 alternating structure are not contemplated as being within the scope of the copolymers susceptible of being photobleached by the process of the present invention. Since the undesirable color which is founded in maleate homopolymers is also present in maleate copolymers wherein the maleate specie or species are present in consecutively repeating units, it is an essential aspect of the present invention that the maleate copolymers of the present invention be random copolymers.

The comonomers which can be polymerized with maleic anhydride, maleic acid or an alkali metal (e.g., Na, K, Li, Ce) salt of maleic acid to form random copolymers susceptible of photobleaching by the effect of ultraviolet light and hydrogen peroxide and use as polyelectrolyte builders include, for example, ethylene, propylene, acrylic acid, methacrylic acid, crotonic acid, 3-butenoic acid and 3-methyl-3-butenoic acid. Specific examples of copolymers which can be photobleached by the process of the present invention to provide white or near-white copolymers include a 1:1 random copolymer of propylene and maleic acid; a 1:3 random copolymer of acrylic acid and maleic anhydride; a 1:4 random copolymer of 3-butenoic acid and maleic acid; a 1:1.9 random copolymer of methacrylic acid and maleic anhydride; a 1.2:1 random copolymer of crotonic acid and maleic acid; a 1:1.5 random copolymer of ethylene and maleic anhydride; and a 1:8 random copolymer of 3-methyl-3-butenoic acid.

The random copolymers hereinbefore described which can be bleached in accordance with the process of the present invention are characterized by molecular weights ranging from about 350 to about 1,500,000. These random copolymers when photobleached by the effect of ultraviolet light and hydrogen peroxide are characterized by a substantially white appearance and accordingly find application as polyelectrolyte builders in detergent compositions.

While the hereinbefore described polymaleate materials relate principally to homopolymers of maleic anhydride, maleic acid, and water-soluble salts of maleic acid and to random copolymers containing a substantial or predominant amount of maleate species and certain comonomer species, particularly adaptable for use as polyelectrolytes in the detergent arts, it will of course be appreciated that other copolymers having a substantial or predominant portion of maleate species adaptable to use in other arts may likewise be photobleached by the process of the present invention so long as the polymers are characterized by the presence of repeating maleate units.

EXAMPLES

The following examples illustrate specific preferred embodiments of the present invention and are intended as being illustrative rather than limitative. Runs I and II describe for purposes of comparison the effects of ultraviolet irradiation alone on polymaleates with no hydrogen peroxide present. Runs I and II are not, therefore, exemplary of the claimed invention. All percentages and ratios in the following examples as well as in this specification and in the appended claims are by weight unless otherwise indicated. Temperatures are expressed in degrees centigrade. In the following examples and runs the extent of decolorization, where graded, was graded on the basis of the following color scale, which for convenience may be denoted as the Berry Color Scale. In this color grading system the grade 0 is ascribed to the color which corresponds to an equivolume mixture of a 5% aqueous solution of cobaltous chloride hexahydrate and a 0.5% aqueous solution of potassium dichromate. Higher grades, X, represent an X to 1 dilution of the 0-grade solution. Thus, a 200 grade is ascribed to a solution which is a 200:1 dilution of the 0 grade solution. Similarly, a grade of 500 represents a 500:1 dilution of the 0-grade solution. The 0-grade solution, i.e., the equivolume mixture of cobaltous chloride hexahydrate and potassium dichromate solutions represents a color corresponding to dark amber or strong tea. Solutions having a 200 grade have a faint yellowish coloration barely distinguishable from plain water. A 500-grade solution has a color which corresponds virtually to water. 10% aqueous solutions of the lightest poly(maleic acid) polymers prepared by any process known in the art yield a color grade of about 30 to 40 which corresponds to a light straw color. When irradiated with an ultraviolet source in the presence of hydrogen peroxide polymaleate materials as will hereinafter become apparent can be substantially improved in color. For example, polymaleate materials of a low Berry Color Grade, i.e. about 10 can be improved to about 50 in a short period of time so as to render feasible their use in detergent compositions. With further irradiation they can be rendered substantially white, this term meaning a color grade of about 200.

Run I

A solution of poly(maleic acid) in water was prepared as follows: Poly(maleic anhydride) was dissolved in a small amount of water, heated to boiling to effect conversion to the acid form and cooled to room temperature, i.e., approximately 25° C. The solution was further diluted with water so as to obtain a solution of polymaleic acid in water of about 10% by weight. The poly(maleic anhydride) employed in the preparation of this solution was obtained by polymerizing maleic anhydride and 2% by weight of acetyl peroxide in benzene in accordance with U.S. Patent 3,359,246 and was a homopolymer characterized by a molecular weight of about 4,000 to about 6,000 as determined by ultra-centrifugal and gel filtration studies.

An amount (75 ml.) of this aqueous solution was placed in a conventional Pyrex photochemical reaction vessel equipped with a nitrogen flush and a water-jacketed Vycor immersion well containing a Pyrex filter. Nitrogen was bubbled through the reaction solution to provide agitation of the poly(maleic acid) solution. A 450-watt high-pressure mercury lamp having a total radiating energy of 175.8 watts was placed into the immersion well and the solution was irradiated. The high-pressure mercury lamp employed in this example was a Hanovia 679A–36 lamp characterized by the following spectral characteristics in watts:

| | |
|---|---|
| Far U.V. 2200 A.–2800 A. | 27.0 |
| Middle U.V. 2800 A.–3200 A. | 28.7 |
| Near U.V. 3200 A.–4000 A. | 28.0 |
| Visible 4000 A.–6000 A. | 75.7 |
| Infra-red 10,000 A.–14,000 A. | 16.4 |
| Total Radiated Energy | 175.8 |

Prior to irradiation the starting solution had a color grade of 10 which corresponds to the color of strong tea. Upon irradiation with ultraviolet light for a period of five hours a color grade of 40 or a four-fold decolorization was achieved. Extension of the irradiation time to eight hours resulted in no further improvement in color and extended irradiation beyond eight hours resulted in a darkening of the solution.

Run II

Run I was repeated except an oxygen purge was employed in place of the nitrogen purge of the previous example. Upon irradiation for a period of half an hour a color grade of 40 was achieved. After one hour a color grade of 60 was attained and after three hours of irradiation it was 75. This 7.5-fold bleaching effect was not permanent, however, and upon standing in the dark the sample underwent slow reversion to the original color grade of 10.

EXAMPLE I

To a 65-ml. solution of poly(maleic acid) in water prepared as in Run I, was added 10 milliliters of a 30% by weight solution of hydrogen peroxide so as to effect a solution containing approximately 10% of the poly(maleic acid) and 4% hydrogen peroxide and having a color grade corresponding to 20 on the hereinbefore described color scale. This solution was treated as follows: A 2-ml. aliquot of the sample was placed in a 2-dram vial and placed in the dark at room temperature and allowed to react. Upon the passage of 1 hour no change in the color change was visually detectable, i.e., the color grade remained at 20. Decoloration to a color grade of 200 was attained upon the passage of 48 hours. A second 75-ml. sample was placed, simultaneously with the placing of the first in the dark, in a conventional photochemical reaction vessel and irradiated at 25° C. with ultraviolet light employing the procedure, apparatus and light source of Run I. This sample was observed to undergo rapid decolorization and attained a color grade of 200 upon irradiation for a period of one-half hour.

EXAMPLE II

The procedure of Example I was repeated except that 5 ml. of 30% hydrogen peroxide solution was added to 70 ml. of the 10% polymaleic acid solution to effect a solution containing 2% hydrogen peroxide. Upon irradiation for a period of half an hour a color grade of 75 was obtained. If irradiation is continued, a solution having a Berry Color Scale value of at least 200 is obtained. A control sample placed in the dark to react underwent no discernible color change in the same amount of time.

EXAMPLE III

The procedure of Example I was repeated except that a 1½% hydrogen peroxide solution was prepared. Upon irradiation for a period of three hours a 75 color grade had been attained. If irradiation is continued, a solution having a Berry Color Scale value of at least 200 is obtained. A control sample underwent no discernible color change in the same amount of time.

EXAMPLE IV

A 75-ml. sample of poly(malec acid) was prepared in the manner described in Example I. A 2-ml. aliquot having a color corresponding to a color grade of 25 was allowed to react in the dark at room temperature and upon the passage of 3 hours underwent no visible color change. The remainder of the sample was placed in a conventional Pyrex photochemical reaction vessel equipped with means for flushing with nitrogen and was irradiated by immersing a monochromatic ultraviolet lamp source directly into the reaction vessel. The light source employed was a Hanau NK 6/20 low-pressure 8-watt mercury lamp emitting 0.9 watt of light in the principal region of wavelength 253.7 m$\mu$. Upon irradiation for a period of 3 hours, the sample underwent decolorization from a color corresponding to a color grade of 25 to a yellow color correspnding to a color grade of 75.

EXAMPLE V

A 20-ml. sample of an aqueous poly(maleic acid) solution prepared as in Example I and containing about 9.4% poly(maleic acid) and 2% hydrogen peroxide was placed into a 50-ml. Pyrex reaction flask and allowed to stand in the path of direct sunlight for a period of 3 hours. The sample underwent photobleaching to an essentially colorless solution. The following table summarizes the color grades visually noted upon the passage of the stated times.

| Time, hr.: | Color grade |
|---|---|
| 0 | 40 |
| 0.5 | 100 |
| 1.5 | 150 |
| 2.5 | 200 |
| 3.0 | 300 |

EXAMPLE VI

A 52-ml. sample of poly(maleic acid) in water containing approximately 10% poly(maleic acid) and 2% hydrogen peroxide prepared as in Example I was irradiated with ultraviolet light by placing the sample in a 100-ml. Quartz reaction vessel in the center of a circular array of sixteen 8-watt lamps emitting principally in the 300 m$\mu$ region in a total amount of 21 watts. The circular array of lamps is commercially available as an array of lamps in a circle of 10″ diameter as the Rayonet Photochemical Reactor and contains sixteen lamps designated in the manufacturing trade as RPR–3000. The solution upon irradiation with ultraviolet light underwent decolorization to an essentially colorless solution. The following table summarizes the color grades observed at the specified stages of the photochemical process.

| Time, hr.: | Color grade |
|---|---|
| 0 | 75 |
| 0.5 | 100 |
| 1.0 | 150 |
| 1.5 | 200 |

EXAMPLE VII

Example VI was repeated except that a circular array of sixteen 8-watt lamps emitting a total of 24 watts principally at the 355 m$\mu$ wavelength was employed and the sample was placed in a 100-ml. Pyrex vessel. The lamps comprising this array are designated in the trade as F8T5BLB. The irradiated solution was essentially colorless upon completion of the irradiation. The following table summarizes the color grades observed in the conduct of the above described photochemical process.

| Time, hr.: | Color grade |
|---|---|
| 0 | 75 |
| 0.5 | 100 |
| 1.0 | 125 |
| 1.5 | 200 |

EXAMPLE VIII

To 20 ml. of 1,2-dimethoxyethane (1 mole) was added 1 gram of poly(maleic anhydride) characterized by a molecular weight of about 4000 to 6000 and prepared by polymerizing a melt of maleic anhydride with 2% acetyl peroxide according to the method of U.S. Patent 3,359,-246. 1 ml. of 30% aqueous hydrogen peroxide was added and the solution was placed in a 50-ml. Pyrex Erlenmeyer flask and irradiated in direct sunlight for 2 hours. The resulting solution was substantially lighter than before treatment with sunlight.

Substantially similar results can be obtained when the following solvents are substituted for 1,2-dimethoxyethane: methanol, ethanol, n-propyl alcohol, isopropyl alcohol, t-butyl alcohol, 2-ethylhexyl alcohol, n-decyl alcohol, ethylene glycol, propylene glycol, 1,6-dihydroxyhexane, 1,10-dihydroxydecane, dimethyl ether, diethyl ether, dioctyl ether, diphenyl ether, methyl phenyl ether, diethylene glycol dimethyl ether.

EXAMPLE IX 1.5 grams of potassium polymaleate [prepared by dissolving 5.5 grams of poly(maleic anhydride) in 50 ml. of water, heating at aproximately 90°–100° C. for one-half hour, heating on a steam bath for approximately 4 hours and neutralizing to pH 10 with potassium hydroxide] was dissolved in 10 ml. of water and 1 ml. of a 30% solution of hydrogen peroxide solution was added. The resulting solution was placed in a conventional 50-ml. Pyrex Erlenmeyer flask and subjected to the direct action of incident sunlight for 1.5 hours. The solution was decolorized to a clear solution.

Substantially similar results can be obtained when sodium or lithium salts of polymaleic acid are employed in lieu of the potassium salt.

EXAMPLE X

Example VI was repeated except that a circular array of sixteen 8-watt fluorescent lamps emitting in the region 350–750 m$\mu$ was employed and the sample was placed in a 100-ml. Pyrex vessel. The lamps comprising this array are designated in the trade as F8T5CW. The irradiated solution was essentially colorless upon completion of the irradiation. The following table summarizes the color grades observed in the conduct of the above described photochemical process.

| Time, hr.: | Color grade |
|---|---|
| 0 | 100 |
| 2 | 160 |
| 4 | 200 |

EXAMPLE XI

A large scale sample of photobleached poly(maleic acid) was prepared by dissolving 1400 grams of poly(maleic anhydride) in 7 liters of water, heating on a steam bath, adding 840 ml. of 30% hydrogen peroxide solution and irradiating with a 450-watt, high-pressure mercury lamp placed into a water-jacketed Vycor immersion well. The solution was stirred and irradiated over a period of 18 hours. The solution upon completion of the irradiating treatment had a color value of greater than 200 on the hereinbefore described Berry Color Scale.

The above sample when employed in a detergent formulation provided excellent building properties and whiteness maintenance characteristics.

EXAMPLE XII

To 75 ml. of water is added 10 grams of a 0.7:1 random copolymer of methacrylic acid and maleic anhydride having a molecular weight of about 4000 to 6000. Upon addition of 10 ml. of 30% hydrogen peroxide, the solution which has a reddish-brown color is irradiated in a conventional Pyrex photochemical reaction vessel equipped with a Quartz water-jacketed immersion well containing a 200-watt, high-pressure mercury arc lamp characterized by a total irradiation of 25,18 watts as follows:

| | |
|---|---|
| Far U.V. 2200 A.–2800 A. | 2.88 |
| Middle U.V. 2800 A.–3200 A. | 4.14 |
| Near U.V. 3200 A.–4000 A. | .346 |
| Visible 4000 A.–7000 A. | 10.6 |
| Infra-red 10,000 A.–14,000 A. | 4.1 |
| Total Radiated Energy | 25.18 |

Upon irradiation for approximately 2 hours, an essentially colorless solution is obtained. Upon evaporation of the water solvent, a near-white copolymer is obtained.

Substantially similar results are obtained when the following copolymers are photobleached in the above manner in lieu of the 0.7:1 copolymer of methacrylic acid and maleic anhydride: a 1:1 random copolymer of acrylic acid and maleic anhydride; a 1:4 random copolymer of 3-butenoic acid and maleic acid; a 1:1.9 random copolymer of methacrylic acid and maleic anhydride; a 1.2:1 random copolymer of crotonic acid and maleic acid; a 1:1.5 random copolymer of ethylene and maleic anhydride; and a 1:8 random copolymer of 3-methyl-3-butenoic acid.

As can be seen from the proceeding runs, irradiation of a poly(maleic acid) solution with ultraviolet light alone does not achieve a permanent bleaching effect. Similarly, the presence of an atmosphere of oxygen does not effect a stable bleaching, the sample undergoing a reversion upon standing in the dark. Only when the combination of hydrogen peroxide and ultraviolet light is employed can polymaleate materials be efficiently and economically decolorized. As can be seen from Example I the effect of ultraviolet light on the peroxide bleaching of poly(maleic acid) is the hastening of the bleaching process by approximately 100-fold. Whereas, 4% hydrogen peroxide bleaching in the dark provides a decolorization corresponding to a color grade of 200 in 48 hours, the simultaneous irradiation with ultraviolet light effects the same decolorization in one-half hour.

Having thus described the invention, what is claimed is:

1. The process of bleaching a polymaleate homopolymer or random copolymer containing at least 45 mole percent of a maleate component selected from the group consisting of maleic anhydride, maleic acid and water-soluble salts of maleic acid which comprises irradiating the polymaleate homopolymer or random copolymer with ultraviolet light in the presence of hydrogen peroxide to provide a polymaleate of improved color.

2. The process of claim 1 wherein the irradiation is conducted in the presence of a solvent.

3. The process of claim 2 wherein the irradiation is characterized by a wave length distribution of from about 200 m$\mu$ to about 400 m$\mu$.

4. The process of claim 3 wherein the irradiation is characterized by wave length distribution of from about 280 m$\mu$ to about 400 m$\mu$.

5. The process of claim 3 wherein the solvent is water and the polymaleate is rendered substantially white.

6. The process of claim 3 wherein the hydrogen peroxide is present in an amount of at least .4% by weight of the composition irradiated.

7. The process of claim 6 wherein the hydrogen peroxide is present in an amount of from about 1 to about 4% by weight of the composition irradiated.

8. The process of claim 6 wherein the polymeric compound irradiated with ultraviolet light is a homopolymer of maleic anhydride having a molecular weight of from about 300 to about 50,000.

9. The process of claim 6 wherein the polymeric compound irradiated with ultraviolet light is a homopolymer of maleic acid having a molecular weight of from about 3500 to about 7000.

10. The process of claim 1 wherein the polymeric compound is irradiated with a high pressure mercury arc lamp having a total power capacity of from about 50 watts to about 10,000 watts.

11. The process of claim 1 wherein the polymeric compound is irradiated with a low pressure mercury lamp having a total power capacity of from about .5 watt to about 50 watts.

12. The process of claim 1 wherein the polymeric compound is irradiated with direct sunlight.

13. The process of claim 6 wherein the polymeric compound is irradiated with ultraviolet light having a wave length of about 253.7 m$\mu$.

14. The process of claim 6 wherein the polymeric compound is irradiated with ultraviolet light having a wave length of about 300 m$\mu$.

15. The process of claim 6 wherein the polymeric compound is irradiated with ultraviolet light having a wave length of 355 m$\mu$.

(References on following page)

References Cited

UNITED STATES PATENTS

| | | |
|---|---|---|
| 1,179,414 | 4/1916 | Elis. |
| 3,186,972 | 6/1965 | Lang et al. _____ 260—78.4 |
| 3,360,448 | 12/1967 | Schneider et al. ___ 204—159.19 |

OTHER REFERENCES

Action of Ultraviolet Rays in the Bleaching of Cellulose; Chimie et Industrie 19, No. 6, pp. 989–97 (June 1928).

The Activation of Hydrogen Peroxide by Light; pp. 720–24, H. A. Curtis; Journal American Chem. Society, 42, 1920.

JOSEPH L. SCHOFER, Primary Examiner

J. KIGHT, Assistant Examiner

U.S. Cl. X.R.

8—111, 103; 204—159.14, 159.15, 159.19; 260—78.5